US012320485B2

(12) United States Patent
Giraud

(10) Patent No.: US 12,320,485 B2
(45) Date of Patent: Jun. 3, 2025

(54) LIGHTING DEVICE FOR A MOTOR VEHICLE

(71) Applicant: VALEO VISION, Bobigny (FR)

(72) Inventor: Sylvain Giraud, Bobigny (FR)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 18/687,067

(22) PCT Filed: Sep. 1, 2022

(86) PCT No.: PCT/EP2022/074362
§ 371 (c)(1),
(2) Date: Feb. 27, 2024

(87) PCT Pub. No.: WO2023/031344
PCT Pub. Date: Mar. 9, 2023

(65) Prior Publication Data
US 2024/0280233 A1 Aug. 22, 2024

(30) Foreign Application Priority Data
Sep. 3, 2021 (FR) ....................................... 2109226

(51) Int. Cl.
*F21S 41/32* (2018.01)
*F21S 41/147* (2018.01)
*F21S 41/25* (2018.01)
*F21W 102/135* (2018.01)

(52) U.S. Cl.
CPC ........... *F21S 41/321* (2018.01); *F21S 41/147* (2018.01); *F21S 41/25* (2018.01); *F21W 2102/135* (2018.01)

(58) Field of Classification Search
CPC ........ F21S 41/321; F21S 41/147; F21S 41/25; F21W 2102/135
See application file for complete search history.

(56) References Cited

U.S. PATENT DOCUMENTS 11,022,266 B2 6/2021 Hermitte et al.
2008/0151567 A1* 6/2008 Albou .................. F21S 41/663 362/507

FOREIGN PATENT DOCUMENTS

EP 3249284 A1 11/2017
EP 3708904 A1 9/2020
FR 3084728 A1 2/2020
FR 1912898 A1 5/2021
JP 2007324001 A 12/2007
(Continued)

OTHER PUBLICATIONS

European Patent Office, International Search Report (with English translation) and Written Opinion of corresponding International Application No. PCT/EP2022/074362, dated Nov. 17, 2022.
(Continued)

*Primary Examiner* — Elmito Breval
(74) *Attorney, Agent, or Firm* — Valeo Vision

(57) ABSTRACT

The invention relates to a luminous device of a motor vehicle, the device including a first luminous module with first and second sub-modules each provided with a light source, and a collector, the first module including a lens which is designed to project the light reflected by the collectors in light beams with a upper cut-off offset vertically from each other.

10 Claims, 3 Drawing Sheets

(56) References Cited

FOREIGN PATENT DOCUMENTS

| | | | |
|---|---|---|---|
| JP | 2008300105 | A | 12/2008 |
| JP | 2010218964 | A | 9/2010 |
| WO | 2022129625 | A1 | 6/2022 |
| WO | 2023007016 | A1 | 2/2023 |

OTHER PUBLICATIONS

European Patent Office, Office Action (with English machine translation) of corresponding European Patent Application No. 22772501.7, dated Mar. 17, 2025, 6 pages.

* cited by examiner

LIGHTING DEVICE FOR A MOTOR VEHICLE

TECHNICAL FIELD

The invention relates to the field of motor vehicle lighting. More specifically, the invention relates to a luminous device of a motor vehicle.

BACKGROUND OF THE INVENTION

Motor vehicle luminous devices, which can project a light beam that provides lighting of the low-beam type, are known. This type of beam generally has a globally flat upper cut-off, but the profile of which varies according to the different regulations relating to the homologation of these luminous devices. For example, European regulation ECE no. 112 requires in particular the globally flat cut-off to be positioned at 0.57° below an original horizontal axis, and must have a projection upwards, whereas American Standard no. 108 requires in particular the globally flat cut-off to be superimposed on this horizontal axis, and does not require a projection upwards.

In order to avoid designing different versions of a single device, each complying with one of these regulations, it is known to break the light beam down into different parts, each produced by means of a specific luminous module. A first luminous module can thus pro-vide a first light beam with an upper cut-off which is substantially flat, whereas a second luminous module can provide a second light beam with a projecting upper cut-off, known as a kink. Each luminous module is provided with regulation means making it possible to modify the vertical and horizontal orientation of these light beams, such that, by combining the first and second light beams, with an appropriate vertical orientation, it is possible to obtain a light beam of the low-beam type which complies with one or the other of the European and American regulations. For example, the first luminous module can be regulated to position the substantially flat cut-off of the first beam to 0.57° below the horizontal axis, and the second luminous module can be regulated such that the projection of the cut-off of the second beam is positioned above this substantially flat cut-off, in order to obtain a light beam of the low-beam type which is statutory in Europe. On the contrary, the first luminous module can be regulated to position the substantially flat cut-off of the first beam at the horizontal axis, and the second luminous module can be regulated such that the projection of the cut-off of the second beam is also positioned at this horizontal axis, in order to obtain a light beam of the low-beam type which is statutory in the USA.

However, this type of solution requires mechanical regulation in the factory of the orientation of the different light beams, which is tedious and requires specific equipment. In addition, the orientations of the beams are liable to become misaligned when the vehicle is running, in particular as a result of poor handling, wear or vibrations, which can necessitate new regulation.

In order to eliminate these disadvantages, a luminous device has been conceived comprising two luminous modules, which can each emit a light beam with a substantially flat upper cut-off, and the vertical positioning of which is different from one beam to the other. Thus, it is sufficient to activate one or the other of these luminous modules in order for one of these light beams to be combined with a light beam with an upper cut-off with a projection, which still remains positioned in the same location, in order to obtain a light beam of the low-beam type according to one or the other of the regulations. However, this solution is not satisfactory in that only one of these modules is lit, with the other one remaining switched off. This lack of homogeneousness in the lit appearance of the luminous device can appear unattractive, and therefore pose a problem.

SUMMARY OF THE INVENTION

The invention thus comes within this context, and its objective is to fulfil the aforementioned need, while eliminating the disadvantages of the different solutions listed.

For this purpose, the subject of the invention is a luminous device of a motor vehicle, the device comprising a first luminous module comprising a first sub-module provided with a first light source, and a first collector comprising a reflective surface which is designed to collect and reflect light emitted by the first light source, the first module comprising a lens which is designed to project the light reflected by the first collector in a first light beam with a first upper cut-off, said first light beam being formed by an image of the reflective surface of the first collector formed by said lens, the first luminous module comprising a second sub-module provided with a second light source and a second collector comprising a reflective surface which is designed to collect and reflect light emitted by the second light source, said lens being designed to project the light reflected by the second collector in a second light beam with a second upper cut-off, said second light beam being formed by an image of the reflective surface of the second collector formed by said lens; characterized in that the first and second sub-modules are designed such that the first upper cut-off is offset vertically in relation to the second upper cut-off.

According to the invention, via a single projection device, i.e. the lens of the first luminous module, it is possible to provide two light beams each having a substantially flat upper cut-off, these cut-offs being positioned at different heights, for example when these beams are projected on a single vertical screen positioned at 25 m from the luminous de-vice, whereas the two sub-modules are regulated in an identical manner. Thus, each of these light beams makes it possible, for example when it is combined with another light beam, to provide a lighting function of the low-beam type corresponding to the requirements of specific regulations. In addition, the lit appearance of the luminous device re-mains the same from one function to the other, and the first luminous module remains entirely lit, irrespective of the lighting function of the low-beam type which it is desired to provide.

Advantageously, each of the first and second luminous sub-modules is designed such that the first, and respectively the second upper cut-off, are a substantially flat upper cut-off.

According to one embodiment, when the first light beam is projected on a vertical screen provided with an orthogonal reference point and positioned at 25 m from the luminous device, the first upper cut-off is positioned at 0.570 below the horizontal axis of said reference point. If applicable, when the second light beam is projected on the same screen positioned 25 m from the luminous device, whereas the regulations of the first and second sub-modules remain unchanged, the second upper cut-off is superimposed substantially on the horizontal axis of said reference point. The first light beam can thus participate in the creation of a lighting function of the low-beam type corresponding to the requirements of EEC regulation no. 112, whereas the second light beam can participate in the creation of a lighting function of the low-beam type corresponding to the requirements of the American regulation type FMVSS 108 or to the SAE Standard. It is conceivable for the first luminous module to comprise a third luminous module provided with another light source, and another collector comprising a reflective surface which is designed to collect and reflect light emitted by this other light source, said lens being designed to project the light reflected by this other collector in another light beam formed by an image of the reflective surface of this other collector, which image is formed by said lens; the cut-off of this other light beam also being offset vertically in relation to first and second upper cut-offs.

Advantageously, the first and second sub-modules are arranged in an adjacent manner along a transverse axis of the luminous device, for example along which said lens of the first luminous module extends. If applicable, the luminous device can comprise a part in which there are formed at least two cavities each defining one and the other of the first and second collectors, each cavity being provided with a reflective coating forming the reflective surface of the collector which it defines. For example, said collectors can comprise a lateral edge, at least one portion of which is common to the two collectors.

Advantageously, each of the first and second collectors has a rear edge, and the lens is designed such that the first light beam has an upper cut-off formed by the image of the rear edge of the first collector formed by said lens, and such that the second light beam has an upper cut-off formed by the image of the rear edge of the second collector formed by said lens, the rear edge of the first collector being offset vertically in relation to the rear edge of the second collector.

For example, the reflective surface of each of the first and second collectors can have a parabolic or elliptical profile. Preferably, it is a surface of revolution of said profile. The revolution is around an axis which is advantageously parallel to an optical axis of said lens. According to one variant, the reflective surface is a free-form surface or a swept surface or an asymmetrical surface. It can also comprise a plurality of sectors.

Preferably, each of the first and second light sources is positioned at a focal point of said reflective surface of the first and respectively the second collector. If applicable, the rays of light reflected by said reflective surface along the rear edge are parallel to an optical axis of said lens, or have an angle of inclination equal to 250 or less, preferably equal to 100 or less on a plane which is vertical relative to said optical axis.

Advantageously, the first and second light sources are fitted on a same support, which in particular is flat. If applicable, said support can be a printed circuit board. Thus, the first and second light sources can emit rays of light in the same direction.

Advantageously, the lens has a focal area which is situated in the vicinity of said rear edge of the second collector. For example, the lens can have a focal line which passes horizontally via the rear edges of the first and second collectors, and passes vertically only via the rear edge of the second collector. According to this characteristic, a slight de-focalization of the rear edge of the first collector is accepted in relation to the lens of the first luminous module, which is not a problem since this type of optical arrangement has a large tolerance in relation to the positioning of its different elements relative to one another.

According to one embodiment of the invention, the first luminous module comprises a plurality of first sub-modules; each provided with a first light source, and a first collector comprising a reflective surface which is designed to collect and reflect light emitted by the first light source; as well as a plurality of second sub-modules, each provided with a second light source and a second collector comprising a reflective surface which is de-signed to collect and reflect light emitted by the second light source, the first and second sub-modules being arranged in a manner which is adjacent to, and alternating with, one another. These characteristics make it possible to reinforce the homogeneousness of the lit appearance of the first luminous module.

According to this embodiment, the lens of the first luminous module is designed to project the light reflected by the first collectors in a first light beam with a first upper cut-off, this first light beam being formed by an image of the reflective surfaces of the first collectors formed by said lens, the first cut-offs being substantially aligned and/or superimposed; and to project the light reflected by the second collectors in a second light beam with a second upper cut-off, this second light beam being formed by an image of the reflective surfaces of the second collectors formed by said lens, the second cut-offs being substantially aligned and/or superimposed and vertically offset relative to the first cut-offs.

Advantageously, the assembly of the first and second sub-modules is arranged in an adjacent manner along a transverse axis of the luminous device, for example along which said lens of the first luminous module extends. If applicable, the luminous device can comprise a part in which a plurality of cavities are formed, defining alternatively one or the other of the first and second collectors, each cavity being provided with a reflective coating forming the reflective surface of the collector which it defines.

Advantageously, the luminous device comprises a control unit which is designed to control selectively each of the first and second light sources, the control unit being designed to light one of said first and second light sources only when the other one of said first and second light sources is switched off.

According to an embodiment of the invention, the luminous device comprises a second luminous module which can emit a third light beam comprising a third upper cut-off with at least one flat portion, the first and second luminous modules being designed such that the flat portion of the third upper cut-off is aligned with the second upper cut-off. If applicable, said flat portion is thus positioned above the first cut-off in order to form a projection. This third light beam can thus be activated simultaneously with one or the other of the first and second light beams, in order to provide a lighting function of the low-beam type according to an ECE R112 regulation, or according to an FMVSS 108 or SAE regulation.

Preferably, the second luminous module is arranged in a manner adjacent to the first luminous module along a transverse axis of the device.

Advantageously, the second luminous module comprises at least one luminous sub-module which is provided with a third light source, and a third collector comprising a reflective surface which is designed to collect and reflect light emitted by said third light source of the second luminous module, the second luminous module comprising a lens which is designed to project the light reflected by the third collector of the second luminous module, said third light beam being formed by an image of the reflective surface of the third collector formed by said lens. If applicable, the third collector can have a rear edge which is provided with a set-back, and said lens can have a focal area which is situated in the vicinity of said rear edge of the third collector, such that said upper cut-off of the third light beam is formed by the image of the rear edge of this third collector formed by said lens.

Advantageously, the second luminous module can comprise a plurality of sub-modules which are arranged in an adjacent manner along a transverse axis of the luminous device, for example along which the lenses of the first and second luminous modules extend.

Advantageously, the second luminous module comprises a third light source and the first, second and third light sources are fitted on a same support, which in particular is flat, for example a single printed circuit board.

Advantageously, the control unit is designed to switch the third light source on simultaneously with one or the other of the first and second light sources.

According to one embodiment of the invention, the luminous device comprises a third luminous module, which is arranged below the first luminous module, and comprises a third sub-module identical to the first sub-module of the first luminous module, a fourth sub-module identical to the second sub-module of the first luminous module, and a lens which is designed to project the light emitted by the third luminous module in a fourth light beam with a fourth upper cut-off, and to project the light emitted by the fourth luminous module in a fifth light beam with a fifth upper cut-off, the third and fourth sub-modules being arranged such that the fourth upper cut-off is aligned with, and/or super-imposed on, the first upper cut-off, and such that the fifth upper cut-off is aligned with, and/or superimposed on, the second upper cut-off.

Advantageously, the luminous device comprises a fourth luminous module which can emit a sixth light beam extending at least partly above the second upper cut-off.

Preferably, the fourth luminous module is arranged in a manner adjacent to the third luminous module along a transverse axis of the device.

Advantageously, the fourth luminous module comprises at least one luminous sub-module which is provided with a light source and a collector comprising a reflective surface which is designed to collect and reflect light emitted by said light source of the fourth luminous module, the fourth luminous module comprising a lens which is designed to project the light reflected by the collector of the fourth luminous module, said sixth light beam being formed by an image of the reflective surface of said collector formed by said lens.

If applicable, the collectors and the light sources of the third and fourth sub-modules of the third luminous module are, relative to the optical axes of the lenses of the third and fourth luminous modules, opposite the light source and the collector of the luminous sub-module of the fourth luminous module.

Advantageously, the lenses of the first and second luminous modules, and optionally of the third and fourth luminous modules, are formed by different portions of a single lens of the luminous device.

BRIEF DESCRIPTION OF DRAWINGS

The present invention will now be described by means of examples, which merely illustrate and in no way limit the scope of the invention, and by the appended drawings, in which the various figures represent.

DETAILED DESCRIPTION OF THE INVENTION

In the following description, elements which are identical in terms of structure or function appearing in different figures retain the same references, unless otherwise specified.

Figure 1:
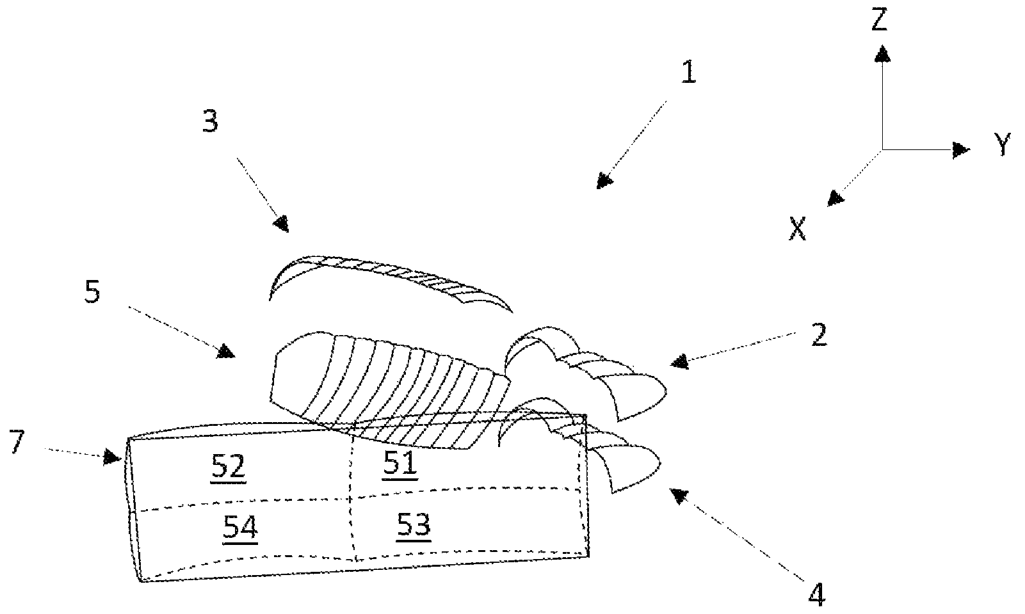
FIG. 1 represents schematically and partly a view in perspective of a luminous device according to an embodiment of the invention.
Figure 2:
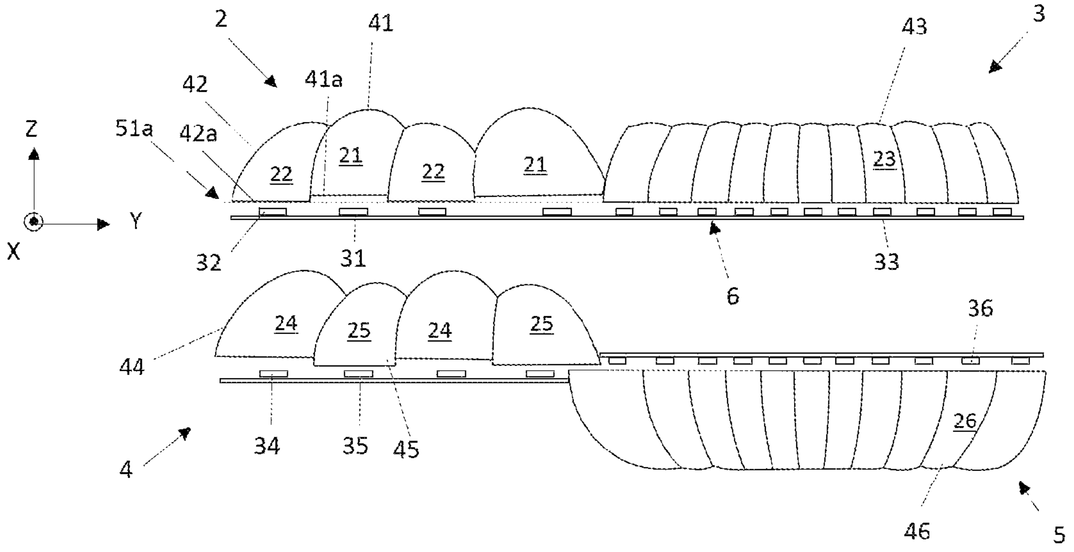
FIG. 2 represents schematically and partly a rear view of the luminous device of FIG. 1.

FIG. 1 represents a view in perspective of a luminous device 1 according to an embodiment of the invention. FIG. 2 represents the luminous device 1 in a rear view.

The luminous device 1 comprises a first luminous module 2, a second luminous module 3, a third luminous module 4, and a fourth luminous module 5.

The first luminous module 2 comprises two first sub-modules 21 and two second sub-modules 22, these first and second sub-modules 21 and 22 being arranged in an adjacent manner, along a transverse axis Y of the luminous device 1, and alternating with one an-other. One of the second luminous modules 22 is thus surrounded by the two first luminous modules 21, and one of the first luminous modules 21 is thus surrounded by the two second luminous modules 22.

Each of these first and second sub-modules 21 and 22 is provided with a first, and respectively with a second light source 31 and 32, and with a first, and respectively with a second collector 41 and 42 comprising a reflective surface to collect and reflect light emitted by this light source. It will be noted that each of the first and second collectors 41, 42 comprises at least one lateral edge, at least one portion of which is common to one of the second, and respectively the first collectors 41.

The first luminous module 2 also comprises a lens 51 which is designed to project the light reflected by each of the first and second collectors in a first, and respectively a second light beam.

Figure 3:
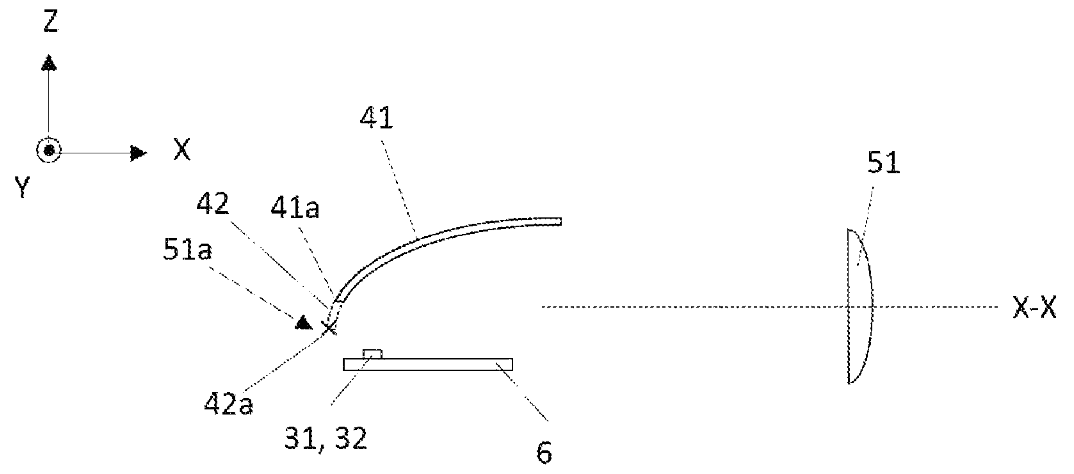
FIG. 3 represents schematically and partly a view in cross-section of the luminous sub-modules of the device of FIG. 1.

FIG. 3 represents a view in cross-section, on a vertical plane XZ, of a sub-module 21 and a sub-module 22 of the first luminous module 2.

Each of the first and second collectors 41, 42 has vertically a truncated parabolic or elliptical profile, defining a cavity in which the first light source 31, and respectively the second light source 32 are arranged. The first and second light sources 31, 32 are light-emitting diodes fitted on a single printed circuit board 6, which can thus emit rays of light in the same direction Z. The printed circuit board 6 is flat, such that the first and second light sources 31, 32 are positioned at the same distance from an optical axis X-X of the lens 51.

The light-emitting diode 31 is positioned at a focal point of the collector 41, such that the rays of light emitted by this light-emitting diode 31 are reflected by the reflective surface of the collector 41 according to an angle of inclination, in relation to the optical axis X-X of the lens 51, equal to 250 or less, and preferably less than 10°. Similarly, the light-emitting diode 32 is positioned at a focal point of the collector 42, such that the rays of light emitted by this light-emitting diode 32 are reflected by the reflective surface of the collector 42 according to an angle of inclination, in relation to this optical axis X-X of the lens 51, equal to 25° or less, and preferably less than 25°.

Figure 4:
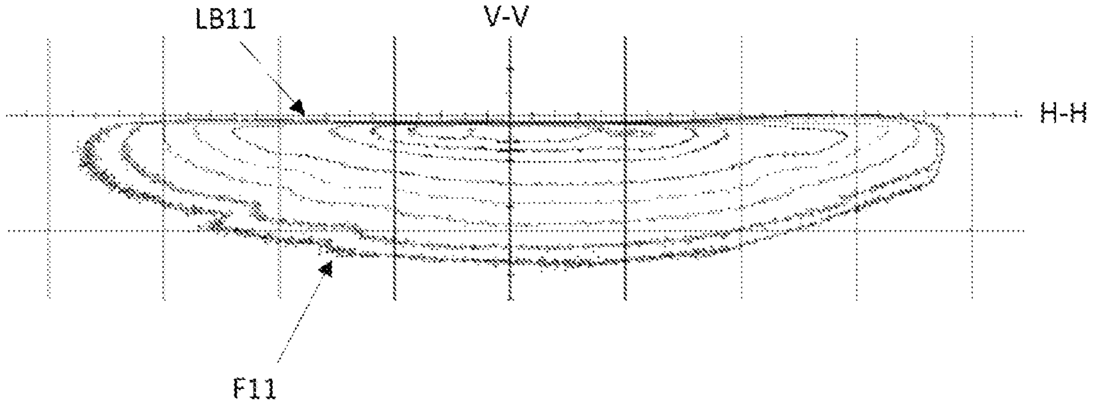
FIG. 4 represents isoluxes of a light beam emitted by one of the luminous sub-modules of the luminous device of FIG. 1.
Figure 5:
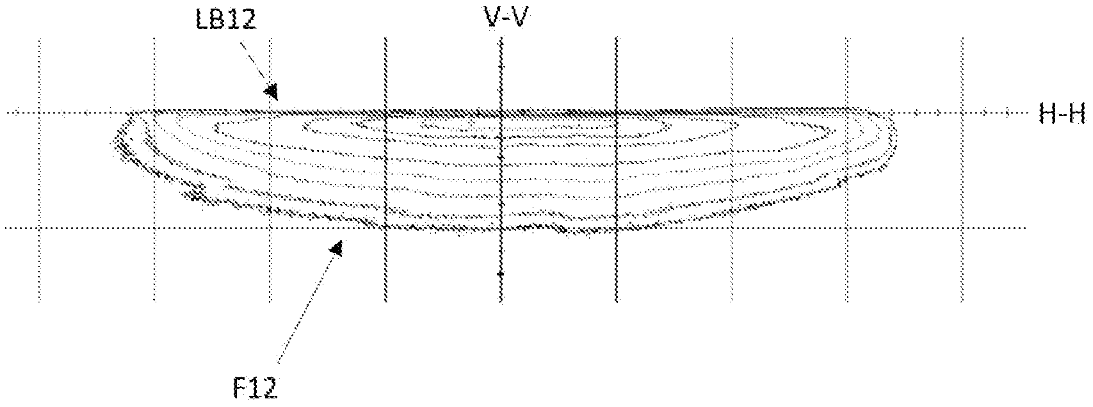
FIG. 5 represents isoluxes of a light beam emitted by another one of the luminous sub-modules of the luminous device of FIG. 1.

The reflective surface of each collector 41 and 42 collects and reflects the light emitted by the light-emitting diodes 31, and respectively 32, towards the lens 51, which is de-signed to project this light onto the road. The first luminous sub-module 21 thus forms a first light beam F11, whereas the second luminous sub-module 22 forms a second light beam F12. FIG. 4 represents a projection, on a vertical screen positioned at 25 m from the luminous device 1, and provided with an orthogonal reference system, of the light beam F11. FIG. 5 represents a projection, on a vertical screen positioned at 25 m from the luminous device 1, and provided with an orthogonal reference system, of the light beam F12, with the regulations of the first and second sub-modules 21 and 22 remaining unchanged in relation to those of FIG. 4.

Each of the first and second collectors 41, 42 thus has a rear edge 41*a*, and respectively 42*a*. It will be noted that the rear edges 41*a* are positioned at the same height in relation to the optical axis X-X of the lens 51, whereas the rear edges 42*a* are positioned at the same height of this optical axis X-X, while being offset vertically relative to the rear edges 41*a*. It can be envisaged that these rear edges 42*a* are on the optical axis X-X.

The lens 51 has a focal area, for example a focal line 51*a*, which passes horizontally via all the rear edges 41*a*, 42*a* of the first and second collectors 41 and 42 (this line thus being curved), and passing vertically only via the rear edges 42*a* of the second collectors 42, while remaining in the vicinity of the rear edges 41*a* of the first collectors 41.

The lens 51 thus projects onto the road the image of the reflective surface of each collector 41, 42, such that the light beams F11, and respectively F12, resulting from this projection, have a first upper cut-off LB11, and respectively a second upper cut-off LB12, delimiting a lit area of an unlit area, formed by the rear edges 41*a*, and respectively 42*a*, of this collector. The rear edges 41*a*, 42*a* each have a substantially elliptical profile, such that the first and second upper cut-offs LB11 and LB12 are substantially flat.

As a result of the relative positioning of the rear edges 41*a* and 42*a*, the first cut-offs LB11 of the light beams F11 are thus aligned with one another, as are the second cut-offs LB12 of the light beams F12, whereas the second cut-offs LB12 are offset vertically upwards in relation to the first cut-offs LB11. In the example described, each first upper cut-off LB11 is thus positioned at 0.57° below the horizontal axis H-H of said reference system, whereas each second upper cut-off LB12 is superimposed substantially on this horizontal axis H-H of said reference system.

The second luminous module 3 comprises a plurality of luminous sub-modules 23, each provided with a light source 33 and a collector 43, as well as with a lens 52.

Figure 6:
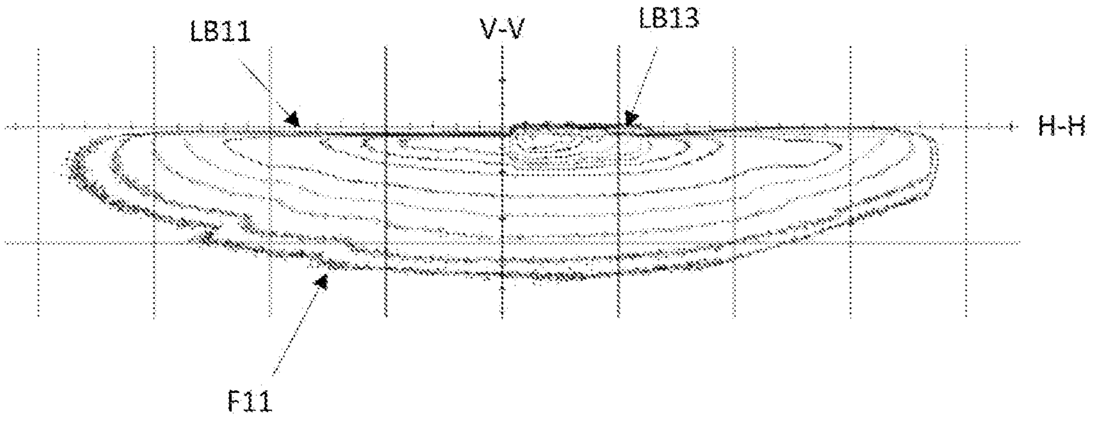
FIG. 6 represents isoluxes of a light beam of the low-beam type obtained by means of the light beam of FIG. 4.
Figure 7:
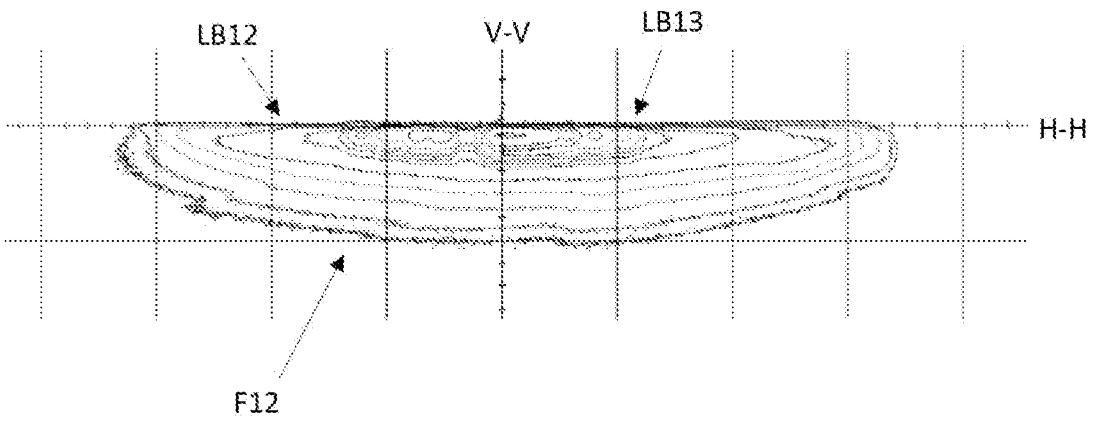
FIG. 7 represents isoluxes of a light beam of the low-beam type obtained by means of the light beam of FIG. 5.

Each sub-module 23 is similar to the sub-modules 21 and 22 of the first luminous module 2, with the exception of the form of the collector 43 of this sub-module, and in particular the profile of its rear edge 43*a*, which has a substantially elliptical profile positioned substantially at an identical height, in relation to the optical axis of the lens 52, as that of the rear edges 42*a* of the second collectors 42 in relation to the optical axis of the lens 51. As represented in FIG. 6 and FIG. 7, the upper cut-off of the light beam, resulting from the projection by the lens 52 of an image of each collector of each sub-module 4, thus has a flat upper portion LB13 which is designed to be aligned with the horizontal axis H-H, and thus with the second cut-off LB12 of the beam F12, or to extend above the first cut-off LB11 of the beam F11.

In other words, when the light sources 31 and 33 are lit simultaneously, and the light sources 32 are switched off, the combination of the light beams as represented in FIG. 6 makes it possible to provide a lighting function of the low-beam type according to the regulation ECE R112. On the other hand, when the light sources 32 and 33 are lit simultaneously and the light sources 31 are switched off, the combination of the light beams as represented in FIG. 7 makes it possible to provide a lighting function of the low-beam type according to the regulations FMVSS 108 or SAE.

It will be noted that the second luminous module 3 is arranged in a manner adjacent to the first luminous module 2 along a transverse axis Y of the device 1, and that the sub-modules 23 of this second luminous module 3 are themselves arranged in an adjacent manner along this transverse axis Y. in addition the collectors 43 are arranged in the same direction as the collectors 41 and 42. Thus, the light sources 31, 32 and 33 can be arranged on a single printed circuit board 6, and the collectors 41, 42 and 43 can be formed by a single part of the luminous device in which cavities are formed, each defining one of these collectors, with each cavity being provided with a reflective coating forming the reflective surface of the collector which it defines.

In the examples of FIG. 1 and FIG. 2, the third luminous module 4 is in every respect identical to the first luminous module 2, and comprises a plurality of luminous sub-modules 24 and 25, each provided with a light source 34, and respectively 35, and with a collector 44, and respectively 45, as well as with a lens 53. The third luminous module 4 is thus designed to form the same light beams F11 and F12 as this first luminous module 2. It will be noted only that the alternation of the first and second luminous sub-modules of this third luminous module 4 is inverted with respect to that of the first luminous module 2.

Finally, the fourth luminous module 5 comprises a plurality of luminous sub-modules 26, each provided with a light source 36 and a collector 46, as well as with a lens 54. The fourth luminous module 4 is designed to project a segmented or pixelized light beam, extending at least partly above the second upper cut-off LB12 of the light beam F12.

It will be noted that the lenses 51, 52, 53 and 54 of these luminous modules 2, 3, 4 and 5 are formed by different portions of a single lens 7 of the luminous device 1.

The luminous device comprises a control unit (not represented), which can receive an instruction for emission of a given photometric function, and is designed, in response to this instruction, to control the light sources 31, 32, 33, 34, 35 and 36, so that they emit light.

For example, during receipt of an instruction for emission of a function of a European low-beam type, the control unit activates the first light sources 31, 33 and 34, with the luminous device then providing said function of the European low-beam type. During receipt of an instruction for emission of a function of the American low-beam type, the control unit activates the light sources 32, 33 and 35, with the luminous device then providing said function of the American low-beam type.

Also, during the receipt of an instruction for emission of a function of the high-beam type, the control unit activates the light sources 31, 33, 34 and 36.

The foregoing description explains clearly how the invention makes it possible to achieve the objectives which it had set out, i.e. of obtaining a luminous device which can provide a lighting function of low-beam type which complies with the requirements of a plurality of specific regulations, and the lit appearance of which remains identical, irrespective of its operating mode.

In any event, the invention is not limited to the embodiments specifically described in this document, and extends in particular to all equivalent means and to any technically work-able combination of these means. It is for example possible to envisage using types of optical device other than the one described, and in particular any optical device comprising one or a combination of a plurality of the following optical elements: reflector, lens, collimator, optical guide, shield. It will also be possible to envisage other profiles and/or other dimensions and/or other positioning of the light beams.

What is claimed is:

1. A luminous device of a motor vehicle, comprising:

a first luminous module including a first sub-module provided with a first light source and a first collector designed to collect and reflect light emitted by the first light source;

a lens designed to project light reflected by the first collector in a first light beam with a first upper cut-off, the first light beam being formed by an image of the reflective surface of the first collector formed by the lens;

a second sub-module provided with a second light source and a second collector designed to collect and reflect light emitted by the second light source, wherein each of the first and second collectors has a rear edge;

the rear edge of the first collector being offset vertically in relation to the rear edge of the second collector:

wherein the lens has a focal area situated in a vicinity of the rear edge of the second collector;

the lens being designed to project light reflected by the second collector in a second light beam with a second upper cut-off;

the second light beam being formed by an image of the reflective surface of the second collector formed by the lens; with the first and second sub-modules being designed such that the first upper cut-off is offset vertically in relation to the second upper cut-off.

2. The luminous device of claim 1, wherein the lens is designed such that the first light beam has an upper cut-off formed by the image of the rear edge of the first collector formed by the lens, and such that the second light beam has an upper cut-off formed by the image of the rear edge of the second collector formed by the lens.

3. The luminous device of claim 2, wherein the first and second light sources are fitted on a same support.

4. The luminous device of claim 1, wherein the first luminous module includes a plurality of first sub-modules; each provided with a first light source, and a first collector including a reflective surface which is designed to collect and reflect light emitted by the first light source; and wherein the first luminous module includes a plurality of second sub-modules, each provided with a second light source and a second collector including a reflective surface which is designed to collect and reflect light emitted by the second light source;

the first and second sub-modules being arranged in a manner which is adjacent to, and alternating with, one another.

5. The luminous device of claim 1, further comprising a control unit which is designed to control selectively each of the first and second light sources, the control unit being designed to light one of the first and second light sources only when a respective one of the first and second light sources is switched off.

6. The luminous device of claim 1, further comprising a second luminous module which can emit a third light beam including a third upper cut-off with at least one flat portion, the first and second luminous modules being designed such that the flat portion of the third upper cut-off is aligned with the second upper cut-off.

7. The luminous device of claim 6, wherein the second luminous module includes a third light source, and wherein the first, second and third light sources are fitted on a same support.

8. The luminous device of claim 7, further comprising a third luminous module, which is arranged below the first luminous module, and includes a third sub-module identical to the first sub-module of the first luminous module;

a fourth sub-module identical to the second sub-module of the first luminous module, and a lens which is designed to project the light emitted by the third luminous module in a fourth light beam with a fourth upper cut-off, and to project the light emitted by the fourth luminous module in a fifth light beam with a fifth upper cut-off, the third and fourth sub-modules being arranged such that the fourth upper cut-off is aligned with or superimposed on, the first upper cut-off such that the fifth upper cut-off is aligned with or superimposed on; the second upper cut-off.

9. The luminous device claim 8, further comprising a fourth luminous module which is configured to emit other light beam extending at least partly above the second upper cut-off.

10. A luminous device of a motor vehicle, comprising:

a first luminous module including a first sub-module provided with a first light source and a first collector designed to collect and reflect light emitted by the first light source;

a lens designed to project light reflected by the first collector in a first light beam with a first upper cut-off, the first light beam being formed by an image of the first collector formed by the lens;

a second sub-module provided with a second light source and a second collector designed to collect and reflect light emitted by the second light source;

the lens being designed to project light reflected by the second collector in a second light beam with a second upper cut-off;

the second light beam being formed by an image of the second collector formed by the lens; with the first and second sub-modules being designed such that the first upper cut-off is offset vertically in relation to the second upper cut-off;

a second luminous module which can emit a third light beam;

a third luminous module, which is arranged below the first luminous module that includes a third sub-module identical to the first sub-module of the first luminous module and a fourth sub-module identical to the second sub-module of the first luminous module.

* * * * *